United States Patent
Engelstein et al.

(10) Patent No.: US 10,386,226 B1
(45) Date of Patent: Aug. 20, 2019

(54) INFRARED SAFETY BEAM SYSTEM

(71) Applicant: MARS INTERNATIONAL, INC., Piscataway, NJ (US)

(72) Inventors: Geoffrey Engelstein, Bridgewater, NJ (US); David Salgueiro, Cranford, NJ (US); Mohamed Abdelhafez, Cranford, NJ (US); Ralph Giffone, Bloomfield, NJ (US); Andrew Lindsay, Somerset, NJ (US)

(73) Assignee: Mars International, Inc., Piscataway, NJ (US)

( * ) Notice: Subject to any disclaimer, the term of this patent is extended or adjusted under 35 U.S.C. 154(b) by 0 days.

(21) Appl. No.: 15/983,973

(22) Filed: May 18, 2018

(51) Int. Cl.
*G01J 1/02* (2006.01)
*G01J 1/04* (2006.01)
*G01V 8/12* (2006.01)
*E05F 15/73* (2015.01)
*E05F 15/60* (2015.01)

(52) U.S. Cl.
CPC ............ *G01J 1/0295* (2013.01); *E05F 15/73* (2015.01); *G01J 1/0238* (2013.01); *G01J 1/0411* (2013.01); *G01V 8/12* (2013.01); *E05F 15/60* (2015.01)

(58) Field of Classification Search
CPC ...... G01J 1/0238; G01J 1/0295; G01J 1/0411; G01V 8/12; E05F 15/60; E05F 15/73
See application file for complete search history.

(56) References Cited

U.S. PATENT DOCUMENTS

| | | | | |
|---|---|---|---|---|
| 3,852,592 A | * | 12/1974 | Scoville ................. | E05F 15/73 250/221 |
| 4,565,029 A | * | 1/1986 | Kornbrekke ............ | E05F 15/73 250/221 |
| 4,823,010 A | * | 4/1989 | Kornbrekke .......... | G01S 17/026 250/221 |
| 2011/0175533 A1 | | 7/2011 | Holman et al. | |
| 2012/0297681 A1 | * | 11/2012 | Krupke ................... | E05F 15/60 49/324 |

OTHER PUBLICATIONS

U.S. Patent and Trademark Office as International Searching Authority, Invitation to Pay Additional Fees, Corresponding Application No. PCT/US2019/024390, May 29, 2019.

* cited by examiner

*Primary Examiner* — Mark R Gaworecki
(74) *Attorney, Agent, or Firm* — Gottlieb, Rackman & Reisman, PC

(57) ABSTRACT

An optical safety beam method and system. A transmitter periodically sends bursts of light pulses with varying strengths. The receiver analyzes the received light pulses to automatically adjust its sensitivity and to detect when the light path is partially obstructed even when there are stray light pulse reflections that reach the receiver.

21 Claims, 13 Drawing Sheets

INFRARED SAFETY BEAM SYSTEM

FIELD OF THE INVENTION

The present invention relates to an optical safety beam system with improved compensation for secondary reflections.

BACKGROUND

Optical safety beam systems conventionally comprise a paired light emitter and light detector and are commonly used to detect when an object has passed between the two by registering at the light detector when the light beam has been blocked. In general, infrared light is used. A typical application is to prevent a garage door or other mechanism from closing when an object is in the door's path.

With reference to FIGS. 1A-1D, the optical transmitter (TX) 12 typically is installed on one side of a door or area to be monitored. The optical receiver (RX) 14 is installed on the other side. The transmitted light is typically output as a fixed energy level signal that is modulated, such as between 35 kHz and 40 kHz to allow it to be distinguished from steady-state ambient light. If the RX 14 detects the modulated light signal, it reports to a door system 16 that there is no obstruction present between the TX 12 and RX 14 and this indication can be used, e.g., to allow an automatic door to be closed. If the IR beam is obstructed the RX 14 will indicate that the area is blocked and the door control system will not allow the door to close.

The TX 12 and RX 14 are typically placed some distance from each other. To allow for ease of installation and alignment of the RX 12 light detector with the main IR beam 18A from the TX, the emitted light is not fully collimated but instead is allowed to spread so that the detector can be placed anywhere within the light cone. Some of the light 18B from the TX 12 will strike surfaces, such as walls and floors, that fall within the light cone and produce reflected light 18C that reaches the RX 14. If an object moves into the direct light path between the TX 12 and RX 14 but only partially blocks the light cone, the RX 14 may receive this reflected light from the nearby surfaces. Common objects that can partially obstruct a security beam include shopping carts and vehicles with high clearances.

As shown in FIGS. 1A and 1B, if the intervening surface is dull, the reflected light beam 18C will be widely scattered. Any reflected light sent from TX 12 reaching the RX 14 will be weak and fall below the detection threshold of the RX 14. In such a case, a partial obstruction will be detected and the control system 16 prevents the door from closing.

A problem arises when there are reflective surfaces between the TX 12 and RX 14 that fall within the light cone. This scenario is shown in FIGS. 1C and 1D. An example of a typical reflective surface is glazed tile or other polished flooring, or reflective wall surfaces. Also, many dull surfaces may become more reflective when wet or worn down. Because of the high reflectivity, much more of the reflected light will be directed towards the RX. In a partial obstruction situation, the strong reflected IR beam 18D will reach the RX and may be bright enough for the RX to improperly signal that the path is not obstructed. As a result, the control system may allow the door, gate, or other mechanism to close with the potential to cause damage and injury.

Some conventional safety beam systems allow an operator to manually adjust the sensitivity of the detector. A crude compensation for partial obstruction conditions can be achieved in such a system by partially blocking the light beam and adjusting the receiver sensitivity until reflected light is no longer detected. However, this requires manual intervention, making each installation custom. In addition, this technique is not suitable for installations in which the distance the light beam travels between the TX and RX can vary, such as when one of the TX or RX units is mounted on a movable object such as a sliding door or where the TX and RX units are fixed but where the light beam is directed at a reflector mounted on the movable object. As the distance the light beam travels from the TX to the RX decreases, the absolute signal strength received for both the main light beam and the reflected beam increases and vice versa. Similar problems can occur even where the TX/RX distance is fixed if the surface reflectivity along the optical path can vary, such as when it is dry versus being wet or icy.

Another conventional way to avoid this issue is to limit the surface materials present between the TX and RX to things that are dull and do not become reflective. However, many such materials are not aesthetically pleasing. In some cases it may not be practical to use materials with surfaces that remain dull under all expected environmental conditions. A conventional solution is to add a non-reflecting covering. For example, a store may put a black rubber mat in front of an automatic door. In addition to the atheistic impact, this also introduces a potential obstacle in the travel path that may cause tripping.

A need therefore exists for an optical safety beam system that can reliably detect a partial obstruction and that compensate for reflective surfaces that can direct stray light towards the receiver. There is a further need for an automatically adaptive system that can distinguish the main light beam from the reflected beam across a range of potentially varying distances and in response to changes in environmental and other conditions and do so without requiring any manual intervention.

Optical safety beam emitters and receivers are conventionally housed in mechanical assemblies that can be mounted on or within a wall, door jam, or other surface. The assemblies also conventionally include visible LEDs that indicate when the device is operating. Conventional arrangements place the LED relatively far from the photodetector. Some popular configurations use a wide receiver housing where the photodetector and LED are spaced apart on the front face of the receiver. It can be undesirable to have an installation where this large surface is exposed when the unit is installed. Other popular configurations place the LED on a different side from the photodetector. Unfortunately, this side can be blocked when the receiver is installed making it more difficult to quickly determine if the unit is operating. There is a need to provide an improved housing for a receiver that provides a very small visible footprint when installed while also allowing an operating status indicator to be easily seen.

SUMMARY

These and other objectives are achieved by a safety beam system that combines an optical transmitter that sends predetermined bursts of light pulses with stepped power levels at periodic intervals and an optical receiver that analyzes the received light pulses to automatically adjusts its sensitivity to reflect ambient conditions and to provide for accurate detection of a partial obstruction of the light beam.

The transmitter is configured to send pulse bursts that include at least one pulse at a full power level, a first control pulse at a first power level less than full power and a second control pulse at a second power level less than the first power. The first and second power levels can be greater then and less than, respectively, a reference power level that represents the average power of a reflection of a full power pulse from a reflective surface in a typical safety beam installation. For example, a typical reflection power loss from a shiny, reflective surface is about −8 dB. The first power level can be −6 dB less than full power and the second power level can be −10 dB less than full power.

The receiver analyzes received light to detect pulses in the bursts sent from the transmitter. An average number of detected pulses per burst is determined for a plurality of bursts. If the determined average indicates that second control pulses are being detected, the detection sensitivity is decreased. If the determined average indicates that at least some of the first control pulses are not being detected, the detection sensitivity is increased. The number of bursts to include in the average can vary. In one configuration, the number is selected based on the difference between the desired number of detected pulses and the previously determined average. The receiver also counts the number of pulses that is detected over a period when a single burst is expected to be received. If less than the number of expected full power bursts are received (or none are received at all), the receiver signals that there is an obstruction.

Advantageously, in this manner the sensitivity of the receiver is automatically adjusted to account for changes in ambient conditions and also set to a level that will detect full power pulses but not pulses of light that are less powerful than first control pulses. By selecting the power of the first control pulses to be slightly greater than the power expected for reflected light pulse, the sensitivity is also set to a level that will not detect reflections of full power pulses. As a result, the system can detect partial obstruction conditions even if a nearby reflective surface directs some of the light pulses to the receiver.

According to a further aspect of the invention, the circuitry for the receiver, including the signal analysis and obstruction detection, can be fully enclosed in a compact housing. Likewise, the transmitter circuitry, with the burst control system, can be fully contained within a compact housing. This allows the present improved safety beam system to be easily swapped in for conventional systems that lack the automatic sensitivity adjustment and partial obstruction features. In a particular configuration, the receiver housing includes a transparent cover assembly on its forward end. The cover has a lens that focuses light on an internal photodetector. The cover also extends inward over the circuit board and functions as a light pipe to carry light from a visible LED (used to signal status such as power or that IR signals are being received), to the front of the receiver. This allows the receiver to be mounted within a wall or other surface leaving only exposed forward surface while also permitting the light from the status LED to be easily viewed.

BRIEF DESCRIPTION OF THE FIGURES

These and other features and advantages of the invention, as well as structure and operation of various implementations of the invention, are disclosed in detail below with references to the accompanying drawings.

DETAILED DESCRIPTION

Figure 2:
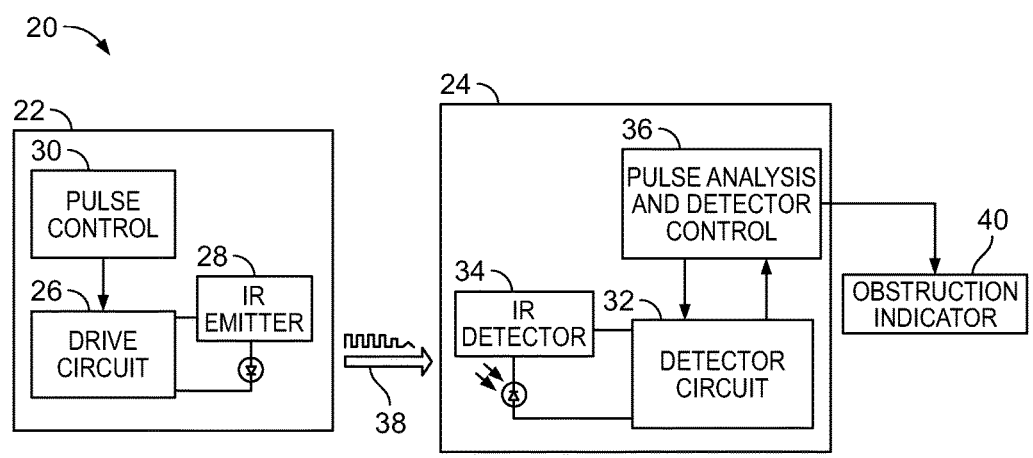
FIG. 2 is a high-level block diagram of a safety beam system according to aspects of the invention.

FIG. 2 is a high level block diagram showing the major components of an improved safety beam system 20 according to aspects of the invention. The system 20 comprises a transmitter TX 22 and receiver RX 24. The TX 22 includes a drive circuit 26 that drives IR emitter 28. The drive circuit 26 is controlled by pulse control circuit 30. The drive circuit 26 and pulse control circuit 30 cooperate to emit a sequence of light pulses at particular intervals and power levels as discussed below. Preferably the pulses are modulated so they can be distinguished from ambient steady-state light by the receiver 24. The power level of each pulse can be controlled in various ways, such as controlling the duty cycle of the modulated pulse, the amplitude of the modulated pulse, or a combination.

RX 24 is comprised of a detector circuit 32 that processes signals received from IR detector 34 and indicates whether or not a pulse is detected. The pulse detection threshold of detector 32 can be adjusted. Pulse analysis and detector control circuit 36 receives pulse detection signals from the detector circuit 32. It analyzes this signal to control the pulse detection threshold of detector circuit 32 and to determine when an obstruction is present in the light beam and outputs an obstruction indicator signal 40 accordingly. Obstruction indicator 40 provides an output signal that is compatible with the safety input for conventional equipment control systems, such as for gates and garage and other automatic doors. It can also be used as an input for security systems.

Figure 1A:
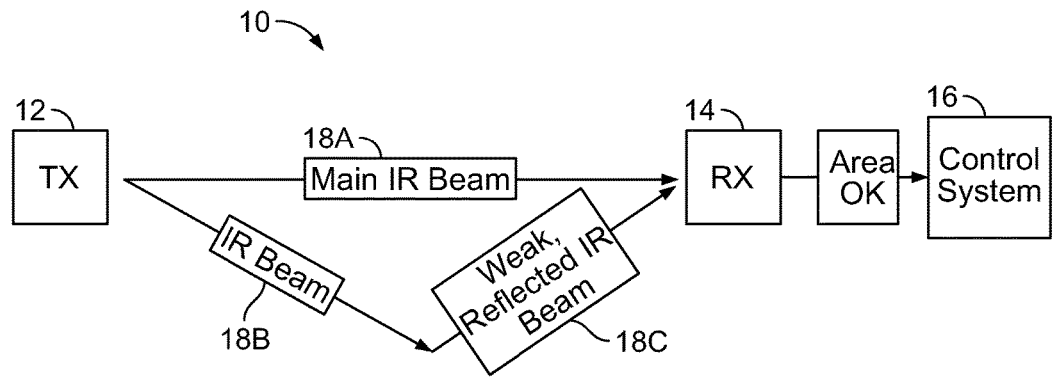
FIGS. 1A-1D show a conventional optical safety beam system with no obstruction and a partial obstruction and where the intermediate surface finish is dull and reflective.
Figure 1B:
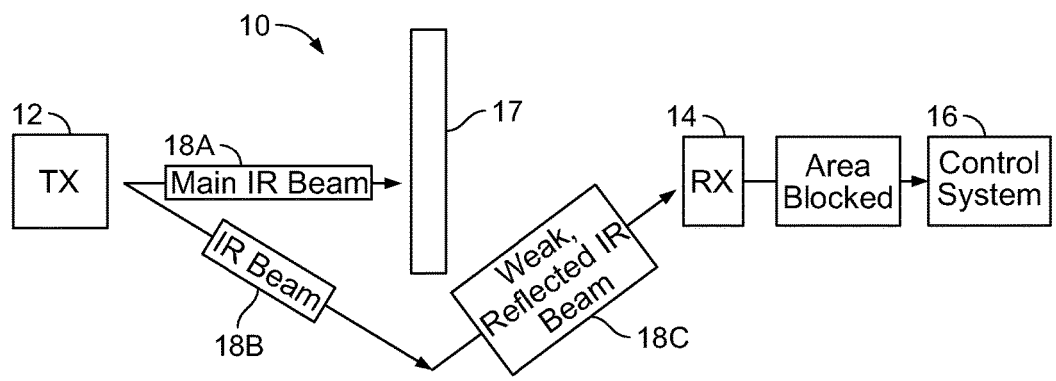
Figure 1C:
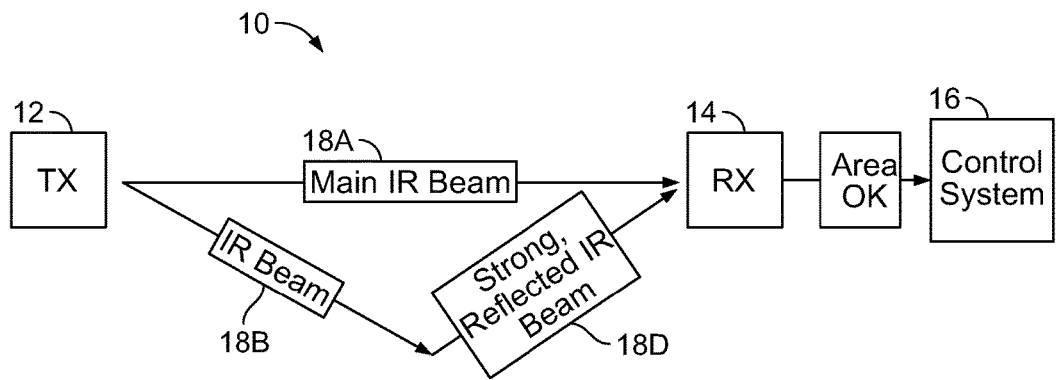
Figure 1D:
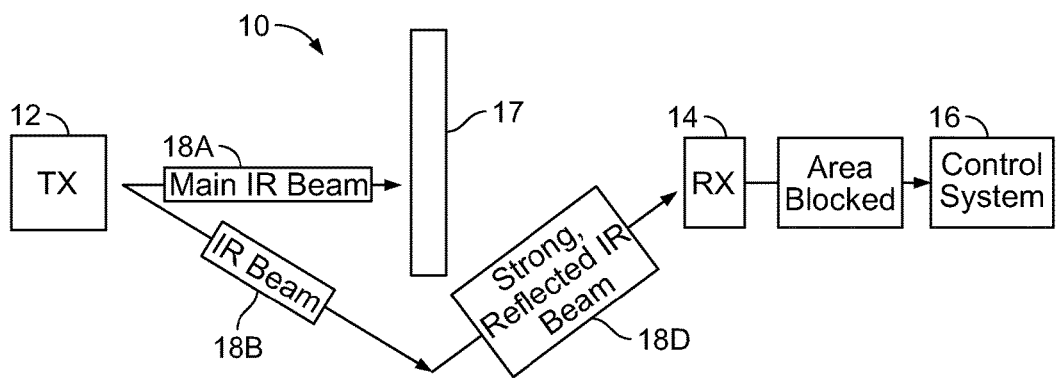

TX 22 is configured to periodically emit bursts of light pulses at a predefined interval. Each burst is comprised of a fixed signal pattern with stepped energy levels such as a sequence of pulses. A burst includes at least one main pulse at a full power level. It also includes at least a first control pulse with first power reduced from full power but greater than a reference power level and a second control pulse with power reduced by more than the reference power level. The reference power level is the full power level reduced by a magnitude of power loss expected by the reflecting the full power pulse from a typical reflective surface in the context of an optical safety beam system. Thus, with reference to FIG. 1C, the reflection loss at least approximately reflects the power difference between the main IR beam 18A and the reflected IR beam 18D as viewed from the RX unit 14.

The detection threshold of detector circuit 32 in RX 24 is adjusted by detector control circuit 36 so that the detector circuit 32 detects the first control pulse at least some of the time (and so also the main pulse(s)) but does not detect the second control pulse. This can be accomplished by the detector control circuit 36 counting the number of pulses detected in each burst because each burst has a predefined number of full power pulses and first and second control pulses. If the count shows that the first and second control pulses are not being detected then the sensitivity of the detector circuit 32 is too low. If the count shows that both control pulses are detected than the sensitivity of the detector circuit is too high. As discussed in more detail below, the burst pulse count is preferably calculated by averaging the number of detected pulses over a number M of bursts, such as 4, 8, or more. The sensitivity is adjusted, if necessary. The next group of bursts is then received and averaged and the adjustment process repeated. This process will allow the system to automatically compensate for slowly changing conditions but still detect a rapid partial obstruction caused by an object moving into and blocking the main light beam in a short period of time during which only one or a few bursts would be sent.

Preferably the detection threshold is adjusted so that it is as close as possible to the intensity of the first control signal as received at the TX 24. The sensitivity of the system is thus adjusted to only be as sensitive as necessary for regulation. This helps limit other light sources from interfering with the system. At this detection threshold, the first control signal may only detected some of the time because of variations in the TX and RX circuitry and the intermediate environment. In a preferred embodiment, where a burst has N main pulses and a first and second control pulse, the detection threshold is adjusted to maintain a determined average pulse count of between N and N+1 and preferably about N+0.5.

As will be appreciated, through this adjustment process the sensitivity of the RX 24 is automatically and continuously set to a level that will detect full power pulses received at RX 24 directly from the TX 22 but will not detect reflected pulses in a partial obstruction scenario (because the reflected full power pulses received at TX 22 are reduced by at least the reflection loss and so are below the detection threshold). As will be further appreciated, this process also continuously adjusts the sensitivity of the RX 24 to compensate for variations in the absolute signal strength received at RX 24 resulting from changes in the length of the light path from the TX 22 to the RX 24, such as when the system is installed in a sliding door. The system thus regulates the RX 24 sensitivity such that that the main IR beam can be discerned from the reflected IR beam automatically, for any practical distance, without requiring that the IR beam be interrupted.

In addition to adjusting the sensitivity of the detector circuit 32, the detector control circuit 36 also monitors the number of pulses received during a burst interval (a time span that encompasses the period when a burst should be present). An obstruction in the light path is indicated when none or fewer than the number of main pulses expected during the burst interval are received. The detector control circuit 36 outputs this condition on the obstruction indicator signal. This signal can then be used by other circuitry to, e.g., prevent a door from closing.

Figure 3A:
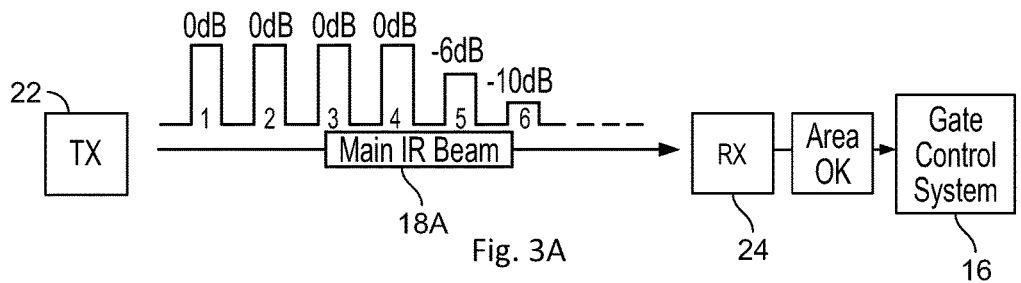
FIGS. 3A-3C show an example burst pattern and aspects of the automatic receiver sensitivity adjustment method.
Figure 3B:
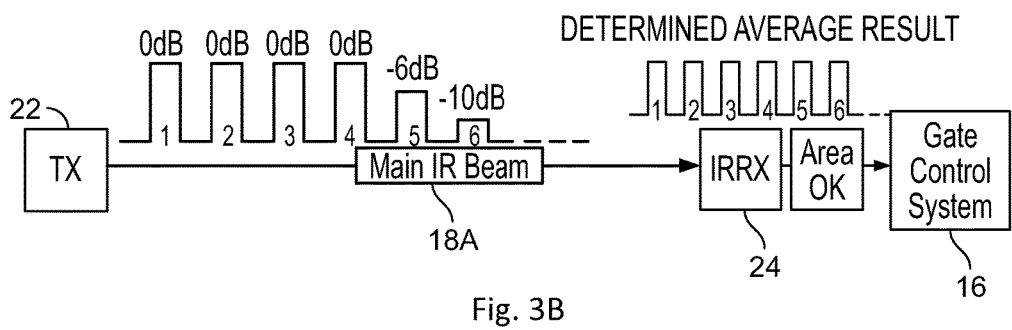
Figure 3C:
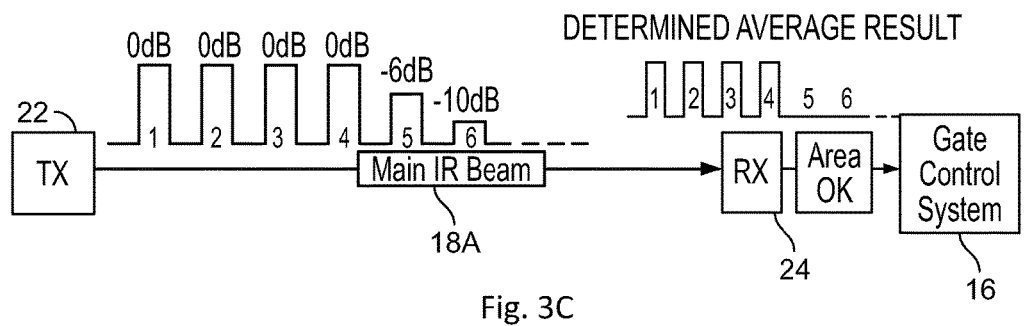

FIGS. 3A-3C illustrate a particular implementation of this automatic adjustment method. The most reflective surface typically found in a safety beam installation is a glazed tile surface finish. Empirical measurements indicate that the reflection loss of a typical main IR beam signal reflected off this type of surface is approximately −8 dB. In this example, the first and second control pulses are set to powers of −6 dB and −10 dB relative to the full power of the main pulse, i.e., above and below the expected reflection loss.

Depending on the precision to which the pulse emission intensity can be adjusted at the TX 22 and the detection threshold adjusted at the RX 24, the differential between the reflection loss value and the power levels of the first and second control pulses may also differ from the +/−2 dB here. For example values of +/− less than 1 dB to greater than +/−2 dB may be suitable. The predefined number of pulses in a burst can vary so long as there are a sufficient number of pulses for the system to identify a burst and determine whether the first and/or second control pulse has been detected in the burst. In some configurations, the power of the first and second control signals can be adjusted by the manufacturer or by the user in the field, such as by means of a potentiometer, control switches, or by changing information stored in device firmware.

The system may also be configured to permit the value of the reflection loss to be adjusted to match expected operating conditions. In one embodiment, the RX 24 can include a training function to set an appropriate value of the reflection loss. For example, the most reflective expected surface for a given installation is placed between the RX and TX, a partial obstruction introduced, and the RX detection threshold adjusted to measure the actual intensity of the received full power pulses. This measured value is then used as the detection threshold.

Returning to FIGS. 3A-3C, each burst sent from TX 22 in this example has 6 pulses—four full power main pulses followed by the first control pulse and the second control pulse. FIG. 3A shows one 6-pulse burst in this configuration. The bursts are spaced apart at least a sufficient amount to allow the RX 24 to detect and process each burst. Preferably, the quiet time between each burst is at least equal in duration to the burst length. Depending on the IR detector circuit 32 used in the RX 24, longer intervals between bursts may be required to avoid saturating AGC or other circuitry in the detector. In this example, the pulses are square waves. Each burst of six pulses can span a period of about 5 ms in duration with a gap of about 15 ms between each burst. A burst can thus be detected by identifying a gap of 15 ms followed by six pulses. The pulses are modulated, such as at 38 kHz (not shown). While the widths and spacing of pulses in the illustrated burst are the same, this is not required and the values could vary. Thus, rather than having four short full power pulses, the burst could have instead one or two longer full power pulses.

FIG. 3B shows a determined average of pulses-per-burst over M bursts in which all six pulses in the burst have been detected by the RX 24. This condition indicates that the detection threshold is too low, i.e., the RX 24 is too sensitive. In response, the detector control circuit 36 raises the detection threshold, thus decreasing the sensitivity of detector circuit 32. FIG. 3C shows a determined average detection in which four of the six pulses, averaged over M bursts, have been detected by the RX 24. This condition means that neither the first nor the second control pulses were detected and so the detector circuit 32 is not sensitive enough. In response, the detector control circuit 36 lowers the detection threshold. Preferably, for this burst configuration, the detection threshold is adjusted to result in a determined average number of detected pulses of 4.5. At this point, the detection threshold for detector circuit 32 is as close as possible to the signal level of the first control signal as received at the detector circuit 32.

In one embodiment, the number of bursts M included in the average is fixed. According to a further embodiment, this number can be varied over time. Preferably, the number of bursts used in a current average is selected based on the difference between the previous average number of detected pulses and the target number of average detected pulses so that the further the difference from the target value, the fewer the number of bursts used in the average. As a result, when the system is far from the desired sensitivity setting, fewer bursts need to be averaged between sensitivity adjustments, increasing the rate at which the system is adjusted. As the system gets closer to the desired target value, the number of bursts averaged is increased. The system reaction to overall environmental changes will thus be slowed while preserving the ability of the system to quickly detect and react to obstructions in the beam path.

For example, M can be set to a large number when the last calculated difference between the average and target value is within a small predefined range (indicating that the sensitivity is near its correct setting) and set to a smaller number when the last calculated difference is larger than the minimum range and so sensitivity is further from the correct setting. For example, the system can switch between setting M to a maximum number of bursts (NEAR_AVG) and a minimum number of bursts (FAR_AVG) depending on whether or not the difference is within the predefined range.

Figure 3D:
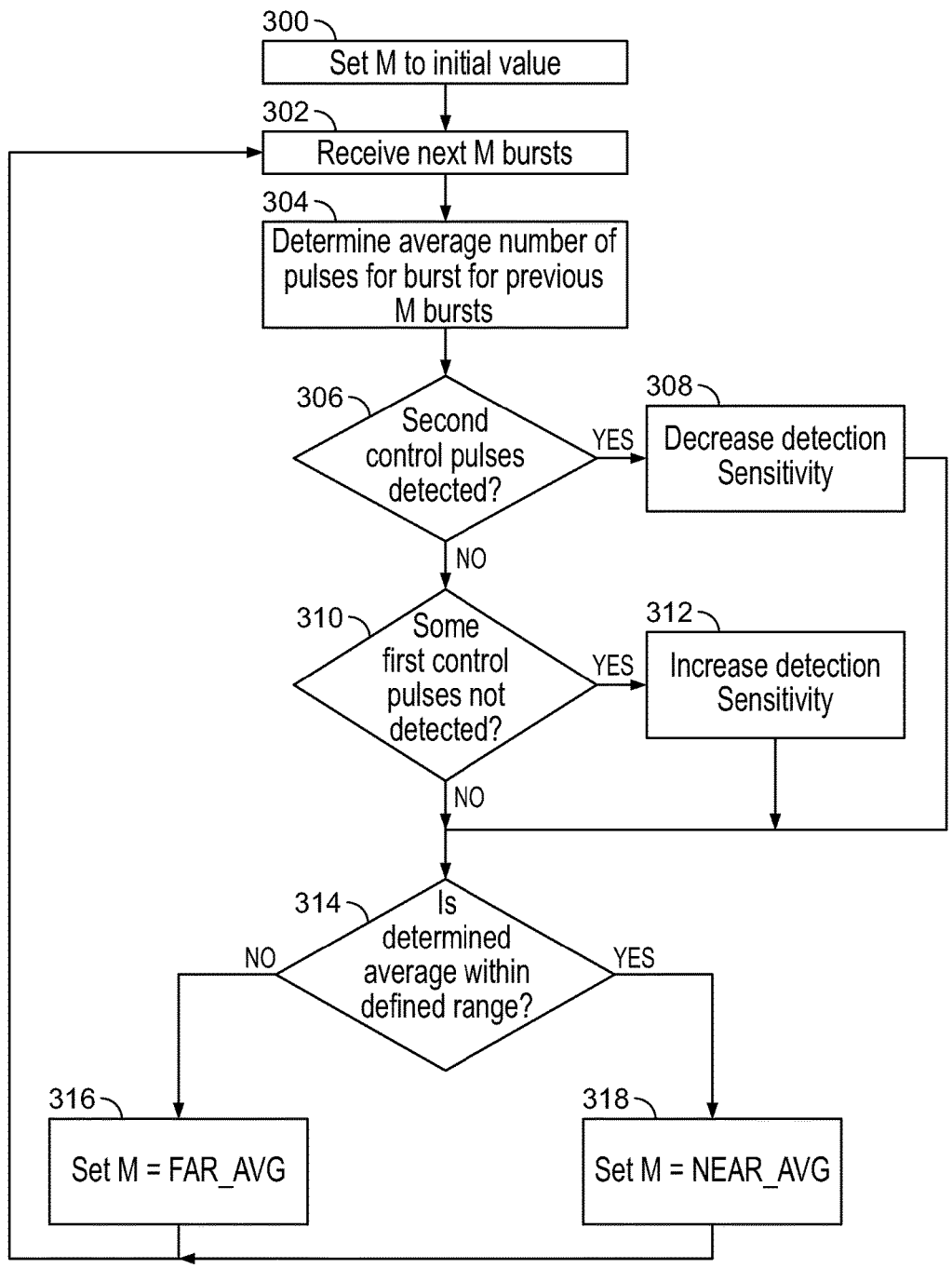
FIG. 3D is a flowchart showing one method for automatic receiver sensitivity adjustment.

This method of sensitivity adjustment is summarized in the flowchart of FIG. 3D. M is initially set to a default value, such as FAR_AVG, NEAR_AVG, or an intermediate value. (Step 300). The next M bursts are received (step 302) and an average number of bursts per pulse is determined (step 304). If the determined average indicates that second control pulses are being detected (step 306) than the detection sensitivity is decreased (step 308). If the determined average indicates that at least some of the first control pulses are not being detected (step 310) than the detection sensitivity is increased (step 312). If the determined average is outside a defined range (step 314), such as within N+/−1, the system is far from the target sensitivity and the value of M to use for the next averaging is set to the FAR_AVG value. (Step 316) If the determined average is within the defined range, the system is near to the target sensitivity, and the value of M to use for the next averaging is set to the larger NEAR_AVG value (Step 318). The system then returns to step 302 to process the next M bursts using the updated value for M. In the flowchart of FIG. 3D, only two values of M are provided. In an alternative embodiment, the system can set M to a value that can vary between the predefined values of NEAR_AVG and FAR_AVG, but where M is increased or decreased, such as incrementally, within these limits to provide for a more granular change in rate of adjustment.

The pulse detection data from the bursts burst used for averaging can be stored in various ways. In one configuration, the system can simply sum the number of pulses detected over the time that the appropriate number of M bursts has been received. After the average is calculated, the value is reset for the next average. Alternatively, the RX can store data from the last FAR_AVG number of bursts since this value represents the maximum number of bursts that could be used in an averaging operation. When a new burst is detected, it is added to storage and data from the oldest burst discarded or overwritten. Each time an average is needed, the stored data for the appropriate number M of most recent bursts can be accessed.

A specific implementation example is now discussed. TX repeatedly produces bursts of 6 pulses in a group about 3 ms in duration with a quiet period of about 14.5 until the next burst starts (for a total time between bursts of about 17.5 ms). NEAR_AVG is 8 bursts and FAR_AVG is 4 bursts. When computing an average using the NEAR_AVG, the RX system sums the total number of pulses over 8 bursts and then computes the average by dividing by 8. When computing an average using the FAR AVG, the system will sum the total number of pulses over a 4 burst period and compute the average by dividing by 4. By taking less time to arrive at an average (4×17.5 ms vs 8×17.5 ms) the RX will adjust its automatic sensitivity control more quickly when the RX IR sensitivity attenuation is far from the desired value.

Preferably, after receiving the appropriate M number of bursts, the RX also waits a small period of time after the group of bursts, such as 3 ms after the last pulse emitted by the TX is received, to compute the average to accommodate small timing variations and ensure that all pulses from the last burst have been received. The RX can further ignore any new pulses received for at least part of the remaining quiet period, such as 9 ms, since any new pulses received at this time would be noise. This 9 ms dead time effectively allows the RX to sync to the TX IR pulses for the purpose of computing the average.

If the determined average number of pulses is within a predefined range including the desired target determined average value, such as a range of less than 4.5 and greater than 3.5 pulses, the RX will use the NEAR_AVG=8 for the next average measurement. If the average number of pulses per IR burst period is outside the range, i.e., less than 3.5 pulses or greater than 4.5 pulses, the RX will use the FAR AVG=4 for the next average measurement.

Figure 4A:
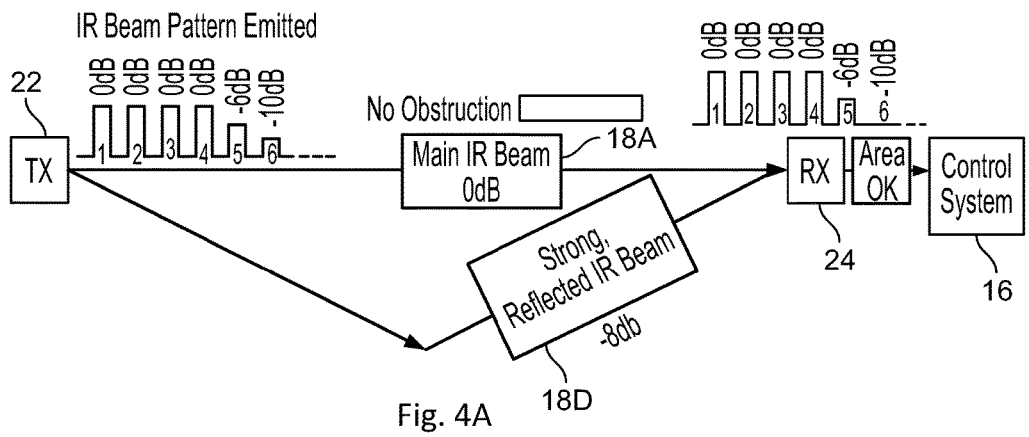
FIGS. 4A-4B illustrate the operation of an exemplary system reacting to an unobstructed and partially obstructed light beam, respectively.
Figure 4B:
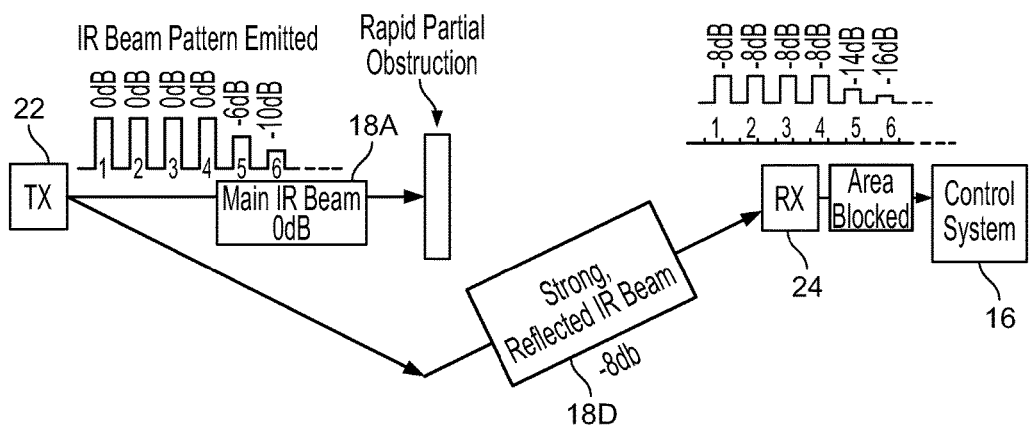

Once the system 20 has dynamically adjusted itself to have a detection sensitivity at the level of the first control pulse, the system will respond to and detect a partial obstruction (as long as it is rapid relative to the length of time of averaging window). With reference to FIG. 4A, when there is no obstruction, the system will detect the first 4 main pulses in each burst and, in at least some cases, the first control pulse. As long as any pulses are detected there is no obstruction. If there is a partial obstruction, only the reflected light beam will reach the receiver. This is shown in FIG. 4B. No pulses will be detected because the reflected intensity of even the full power pulses is less than that of first control pulse, as shown in FIG. 4B.

When the detector control circuit 36 expects to receive a burst but no pulses are detected, it signals that an obstruction is present. One way to detect this condition is to keep a running count of the number of pulses over a time window that equals the period between each burst. One burst should always be within this window. If the count is zero, the burst is not detected. As will be appreciated, when there is a partial obstruction, the system will react within a period of time equal to the interval between pulses.

Figure 5A:
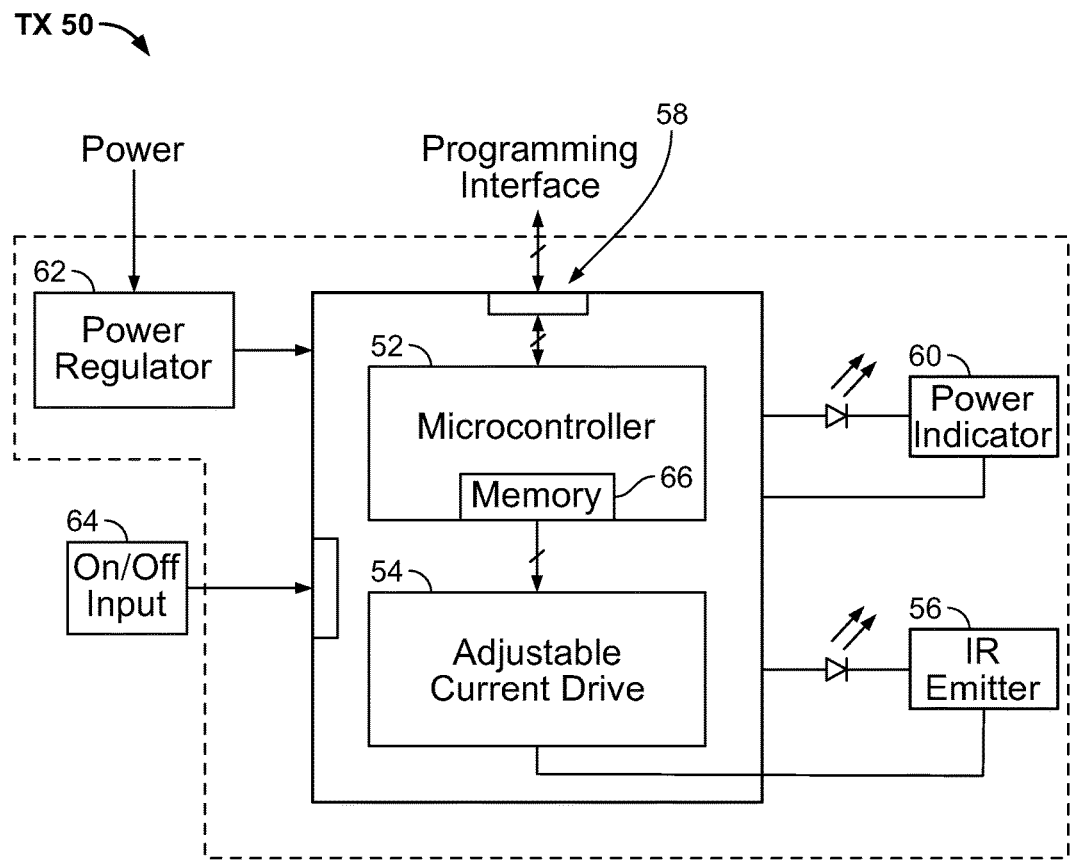
FIG. 5A is a high level block diagram of a transmitter unit according to a particular embodiment.

FIG. 5A is a block diagram of a TX 50 according to a particular embodiment. TX 50 is comprised of a microcontroller 52 that controls an adjustable current drive circuit 54 which powers an IR emitter 56. The signals from microcontroller 52 to drive circuit 54 are used to control when the IR emitter 56 is powered by drive circuit 54. The microcontroller 52 is programmed to activate current drive circuit 54, and thereby the IR emitter 56, to produce a burst of pulses at predefined intervals as discussed above. In one embodiment, the microcontroller also modulates the pulse-on signals sent to the drive circuit 54 at the appropriate frequency, such as 38 kHz. Alternatively, a separate modulating circuit could be provided. The program for the microcontroller 52 can be stored in a memory, such as on-board memory 66. A programming interface 58 can be provided to allow various settings in the program to be adjusted. The interface 58 may also allow the program itself to be loaded and/or updated.

The adjustable current drive 54 can be implemented using a variety of conventional designs. In one embodiment the drive signal for a current supply circuit is coupled to a series of parallel resistors each of which is enabled by a respective microcontroller output. By selectively turning on and off one or more of the microcontroller outputs, the effective resistance can be varied and thereby control how hard the current supply circuit is driven. The microcontroller 52 can then adjust the current drive 54 so that pulses are output at full power, at the level for the first control pulse, such as −6 dB lower, and at the level for the second control pulse, such as −10 dB lower. The overall power of a modulated pulse may also be adjusted using PWM techniques under control of the microcontroller as an alternative to using a current drive circuit that is adjustable or in combination with an adjustable current driver to provide further flexibility.

Various conventional microcontrollers can be used to generate the desired pulse sequence, such as an STM8 series microcontroller from STMicroelectronics. Alternatively, because the pulse sequence pattern can be predefined, the system that controls current drive 54 can be implemented using dedicated analog and/or digital circuitry. For example, the control logic could be implemented in an ASIC or FPGA.

The circuit may also include a visible power indicator, such as visible LED 60, which will indicate when the circuit is operating. A power input and power regulator circuit 62 are provided to supply power to the circuit. An on/off input 64 can be provided to turn the circuit on and off.

Figure 5B:
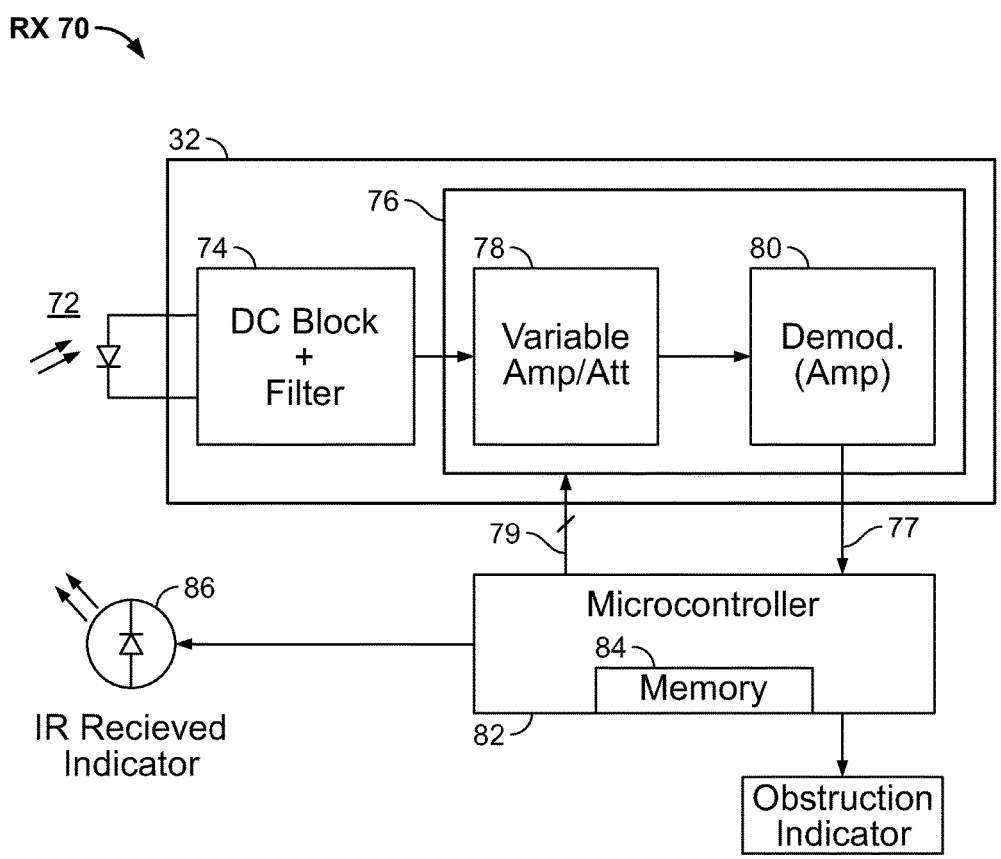
FIG. 5B is a high level block diagram of a receiver unit according to a particular embodiment.

FIG. 5B is a block diagram of an RX 70 according to a particular embodiment. IR photodiode 72 detects incoming IR signals. The signal from the photodiode 72 is processed by detector circuit 32 which in this configuration comprises a DC blocking (steady state light blocking) and filter circuit 74 that outputs the filtered received modulated AC signal. Circuit 74 can also provide the bias to the photodiode 72. The signal output from the blocking and filter circuit 74 is then input to a controllable amplifier or attenuator and pulse detection circuit 76 that includes a demodulator and outputs a signal 77 that indicates when a detectable pulse is present. One or more inputs 79 are provided to control the sensitivity of the detection circuit and thus set the detection threshold.

A microcontroller 82 receives the pulse detection signal 77 and controls signals 79 input to the pulse detection 76 to adjust the detection threshold. The microcontroller 82 executes a control program stored in memory, such as on-board memory 84, to count the detected pulses, adjust the detection threshold, and detect when an obstruction is present as explained above. When an obstruction is detected, this condition is output on the obstruction indicator output signal.

The RX 70 also includes an appropriate power input and power regulator (not shown). Further included is a visible IR received indicator or power indicator, such as an LED 86.

In a specific implementation the pulse detection circuit 76 can be built around a conventionally available IR demodulating circuit 80, such as those used for IR remote control input circuits. These circuits 80 are typically designed to amplify and demodulate IR signals at a specific modulation rate, such as 36 or 38 kHz. (Of course, the modulation rate of the TX circuit must match that expected by the receiver.)

Conventional demodulating and pulse detection circuits 80 of this type may not have a user-adjustable detection threshold or it may not be adjustable to the appropriate degree. In such case an additional variable pre-amplifier 78 can be used. If the demodulator and pulse detector 80 is sufficiently sensitive, instead of an amplifier, a variable attenuator 78 can be used. Attenuation has the advantage of limiting the introduction of additional noise to the received signal as compared to an amplifier. Conventional designs for a variable amp or attenuator 78 can be used, modified or supplemented as appropriate to permit control by one or more outputs of the microcontroller 82.

Conventional demodulating and pulse detection circuits 80 may also include their own AGC circuitry. Care should be taken to ensure that this internal AGC circuitry does not interfere with the circuit operation. If it cannot be disabled, one way of minimizing its impact is to increase the spacing between pulse bursts to several times the duration of a single pulse burst, such between 2 and 5 times that duration to allow the internal AGC circuit to settle between bursts.

One particular pulse detection circuit 80 that can be used in a specific embodiment is the VSOP38338 from Vishay Semiconductors. This chip is coupled to a variable attenuator circuit 80 as discussed above. In the particular embodiment using this specific detection circuit 80, pulse bursts are about 5 ms long with a spacing of 15 ms (3× the pulse burst width) between bursts. In this configuration, an obstruction of the light path, such as by a person's arm swinging across the beam, can be detected within 20 ms.

In the embodiment above, RX 24 can operate independently of the TX 22. In an alternative embodiment, instead of adjusting the sensitivity of the detector circuit 32, the system can instead use a fixed sensitivity detector and adjust the power of the emitted light pulses until the desired pulse detection count is achieved at the receiver. In this alternative embodiment, the RX would produce a signal indicating the average pulse count or if the light pulse power should be increased or decreased. The TX would then adjust the signal strength accordingly. Because this alternative requires feedback from the RX to the TX, it is suitable for cases where emitter and receiver can be in close physical proximity, such as where the TX and RX are combined into a single unit and the emitted light is directed to a reflecting target.

In a further alternative, the RX unit can include a wireless transmitter, such as WiFi or Bluetooth, that is used to transmit a signal that indicates the average pulse count and is detected by a receiver in the TX unit and processed accordingly. If the system is configured so that the obstruction indicator provides a wireless output signal to the controlled equipment, the same transmitter may also be used to send the feedback signal to the TX unit.

Providing a wired or wireless feedback signal between the TX and RX will allow the light transmission power to be reduced to as low as possible. This is particularly advantageous when the TX unit is battery powered since the light transmission is a major power drain and reducing this drain can substantially increase battery life.

In a further embodiment, the TX and RX units are configured to operate only when an enable signal is present. The enable signal can indicate that the door being monitored is open or the area being monitored for obstructions is otherwise accessible. In this manner, the TX and RX units only operate when needed. This can substantially decrease overall power consumption when the monitored area is accessed only infrequently and thus allow battery powered units to operate for a much longer period of time before the battery is exhausted.

In yet a further embodiment, a battery powered TX or RX unit can include an inductive power receiver. The inductive energy transmitter can be mounted next to a point where the TX/RX unit frequently passes or remains adjacent to for an extended period of time. When the unit is next to the charger, the battery will be charged. This configuration allows for increased battery operation time and avoids the need to provide a wired power line to the TX or RX unit itself, eliminating a point of failure, particularly in environments where the unit is mounted to a moving object, such as a sliding door or gate.

Figure 6A:
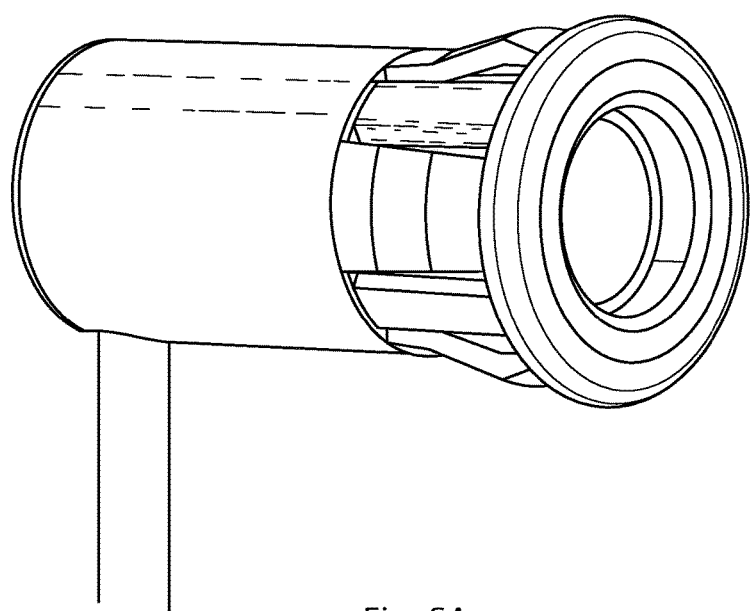
FIGS. 6A-6G show various views of and components within a housing configuration suitable for use with an optical receiver.

According to a further aspect of the invention, the complete active circuitry for the RX unit (FIG. 2; 5B) is contained in a small elongated housing 90, such as a cylindrical housing shown in FIG. 6A, that can be inserted into a hole in a surface to which the RX unit is to be mounted. A wire cable connected to the housing can be used to provide power and carry the obstruction indicator signal. Advantageously, this permits a receiver with the improved reflection compensation circuitry to be directly swapped in place for a conventional IR beam detector that does not account for reflections and partial obstructions. A similar housing can be provided for the active circuit in the TX unit (FIG. 2; 5a). Preferably, the receiver housing has a length between about 20 mm to 40 mm, preferably about 30 mm, and a diameter of between about 10 mm and 20 mm and preferably about 15 mm. The transmitter housing unit can be similar in size. Of course, other housing shapes can be used as appropriate.

The internal structure of housing 90 is addressed below and with reference to FIGS. 6B-6G. The components for an IR receiving system, such as RX 24 discussed herein, are mounted on a circuit board 100. The circuit components include an edge mounted photodetector 102 extended from leading edge 100b of the circuit board 100. An LED 104 is also mounted on the circuit board and positioned so that at least some of the light is directed forward (towards edge 100b).

Figure 6B:
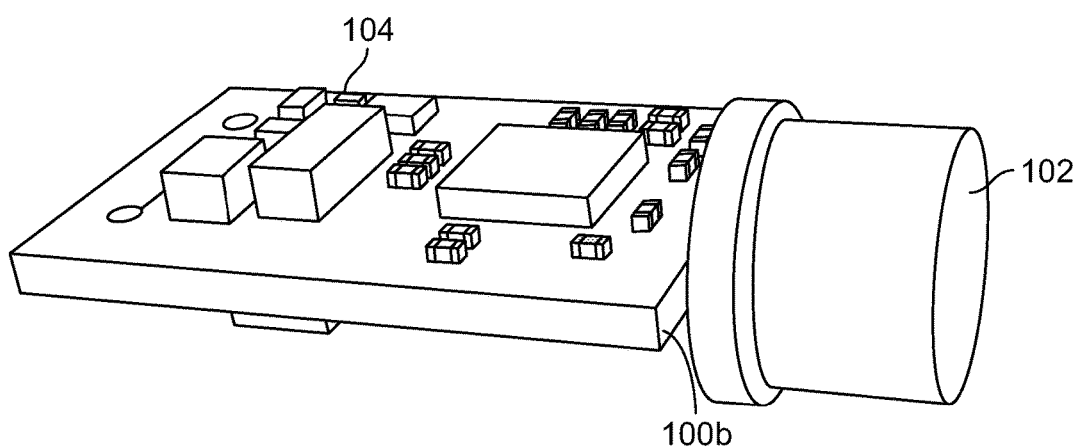
Figure 6C:
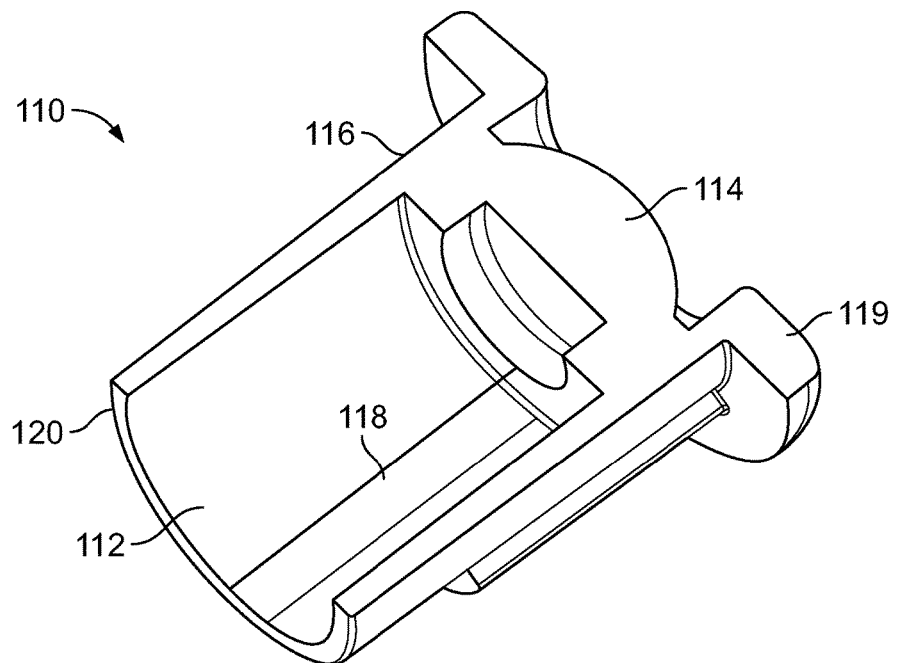
Figure 6D:
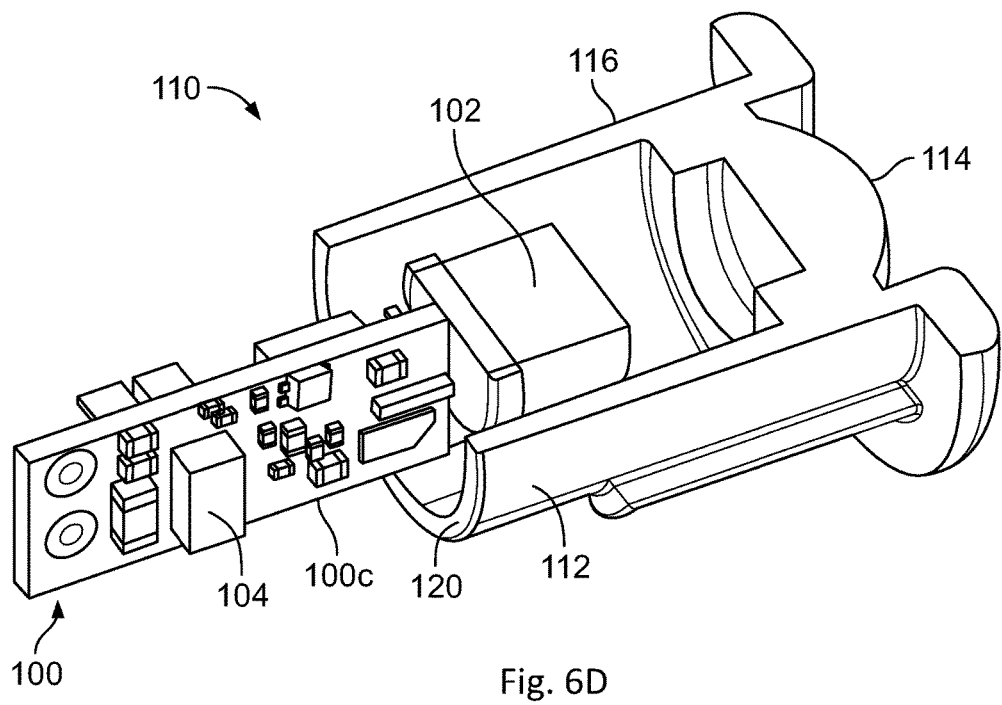
Figure 6E:
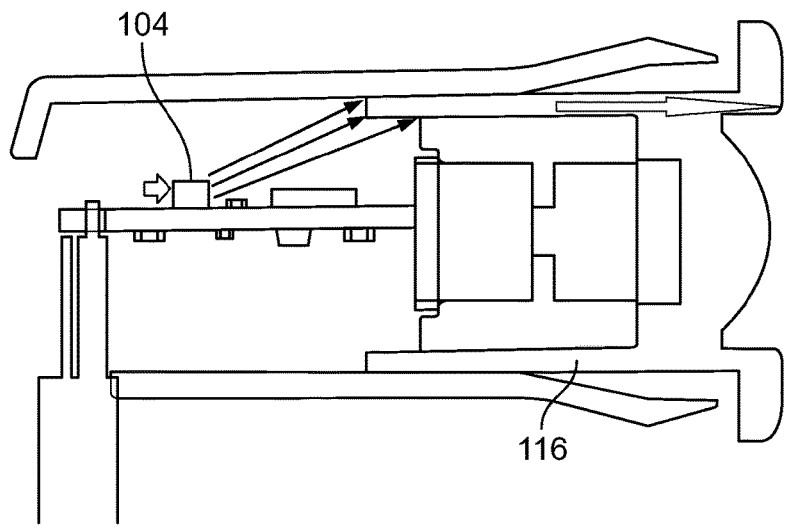
Figure 6F:
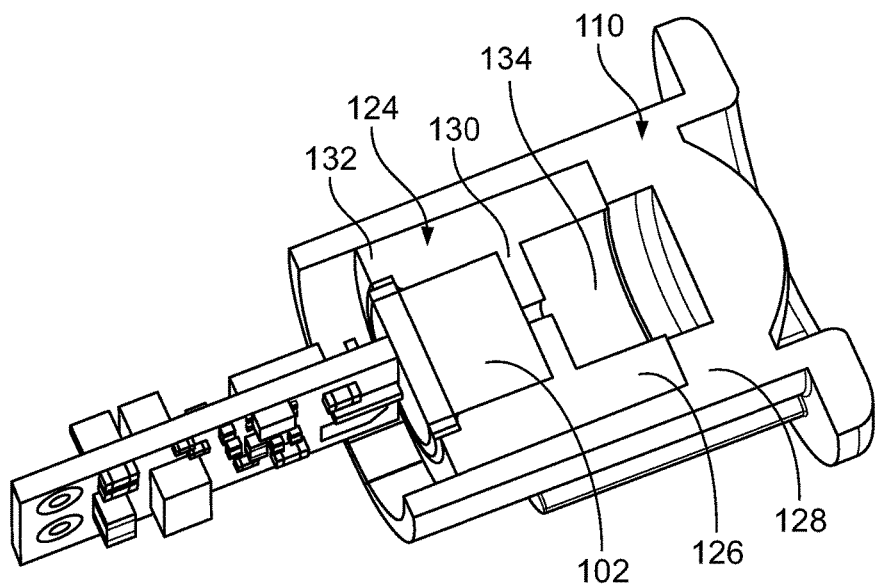
Figure 6G:
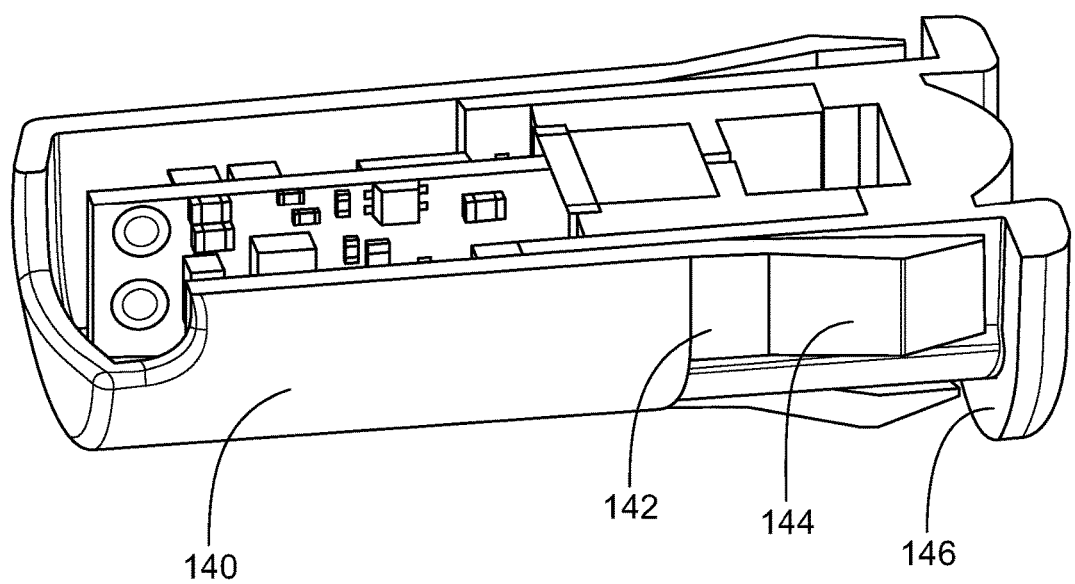

With reference to FIGS. 6B and 6C, a cover assembly 110 is provided and fitted over the photodetector 102 and extends over at least part of the circuit board 100. A perspective cross section of one configuration of cover assembly 110 positioned relative to the circuit board 100 is shown in FIG. 6D. The cover assembly 110 is formed of a transparent material that conducts both visible and IR light. It includes at least a tube portion 112 and a lens 114 formed at or near a forward end 116 of the tube 112. In the illustrated embodiment, the lens 114 is recessed slightly so that the lens does not extend out past forward end 116.

When the cover assembly 110 is fitted in place, the lens 114 focuses received IR light onto the photodetector 102. In the illustrated configuration, tube 112 is cylindrical. However, other cross-sections, such as square, are also possible. The interior of tube 112 can include at least one axial shelf or groove 118 to receive a side edge 100c of the circuit board 110 and help hold the circuit board 100 in place. An extending flange or boss 119 can be provided at the end 116 of the assembly 110.

In addition to supporting a lens 104 for the photodetector 102, the transparent cover assembly 110 also functions as a light pipe that conveys light from the LED 104 to the front of the cover 110. LED and cover assembly 110 are positioned relative to each other to allow the light from the LED to enter. In one configuration, the rear portion 120 of tube 112 is positioned forward of LED 104 and preferably has a flat surface. Light from the LED 114 enters at this surface and is transmitted through the tube 112 where it is emitted at its front.

The optical connection between the LED 104 and the cover assembly 110 can be improved by filling the gap between the LED 104 and the assembly 110 with a clear epoxy resin (potting compound). The resin can also serve more generally to protect the circuit board 100 and components on it against corrosion and moisture. It also can provide strain relief to the wire extending from the circuit board used to carry power and the obstruction detection signal.

In a particular configuration, the cover assembly 110 is not fitted directly to the photodetector 102. Instead, intermediate cover 124 is placed over the photodiode 102 and the cover assembly 110 then fits over this intermediate cover 124. Preferably, intermediate cover 124 is made of an opaque material, such as plastic. The intermediate cover 124 can extend forward from the end of the photodiode 102 and have a leading surface 126 that engages a shelf 128 inside the cover assembly 110 to thereby position the position the cover assembly 110 in a predefined position relative to the photodiode. The intermediate cover 124 can also include one more shoulders 130, 132 that rest against respective parts of the photodetector 102 when the cover 124 is mounted. The shoulders 130 can extend inwards most of the way to the center and define a stop within the intermediate cover 124 with aperture 134 to help reduce the impact of internal light reflections.

Figure 7:
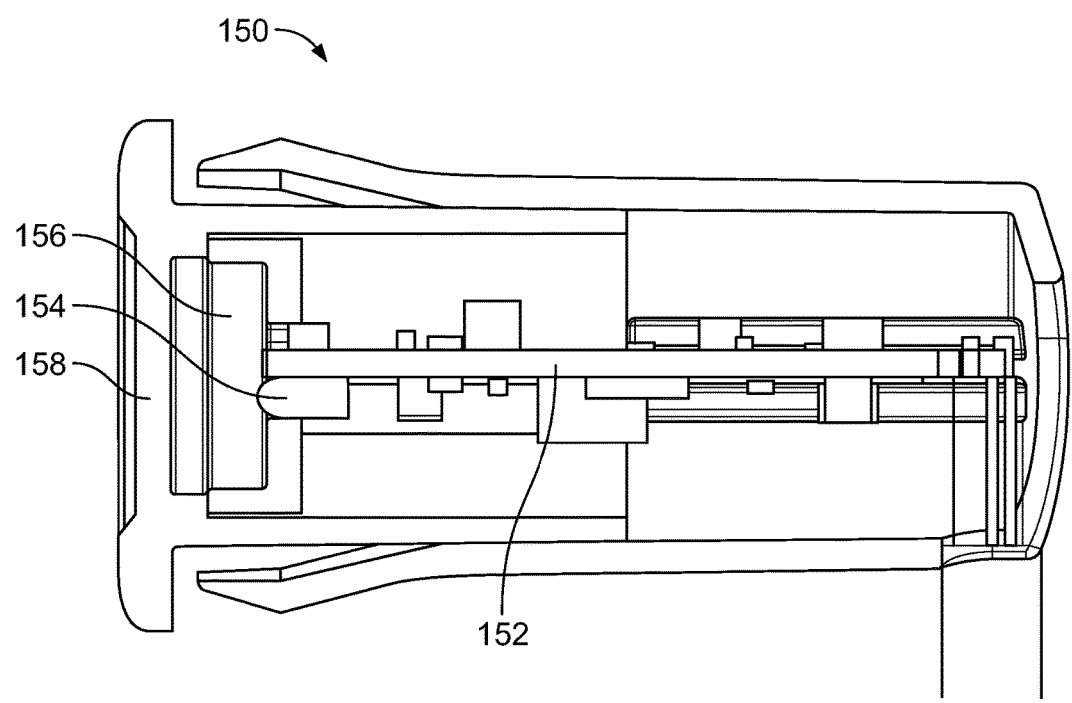
FIG. 7 shows a view of a housing configuration for use with an optical transmitter.

An outer cover 140 can be placed over the cover assembly 110 and circuit board 100. The cover 140 can include a plurality of elastic fingers 142 with detents 144 that will retain the complete device in place when inserted into a mounting hole in a surface. The rear surface 146 of the flange 119 prevents the device from being inserted too far. The cover can also include an internal axial edge or groove to receive the edges of the circuit board 100. The TX unit can be placed in a somewhat similar housing. One configuration for a housing 150 is shown in cross section in FIG. 7. The TX circuitry is contained on the internal circuit board 152. The IR emitter 154 is on one side of the circuit board and the visible LED 156 is on the other side. Light from both can be emitted through a transparent cover 158. Alternatively, the visible LED 156 can be positioned further back and the transparent cover 158 used as a light pipe similar to cover assembly 110.

Aspects of the invention have been disclosed and described herein. However, various modifications, additions and alterations may be made by one skilled in the art without departing from the spirit and scope of the invention as defined in the appended claims.

What is claimed is:

1. A method for automatically adjusting the sensitivity of an optical safety beam system including an optical transmitter with a light source and that emits light pulses directed to an optical receiver, the optical receiver having an adjustable light pulse detection sensitivity, the method comprising the steps of:
   periodically sending from the transmitter bursts of a predetermined number of light pulses, each burst comprising N full power light pulses, N greater than or equal to 1, a first control pulse at a first power level less than full power and a second control pulse at a second power level less than the first power level;
   automatically adjusting the detection sensitivity of the receiver by determining an average number of detected pulses per burst for a plurality of bursts;
   decreasing the detection sensitivity if the determined average indicates that second control pulses are being detected; and
   increasing the detection sensitivity if the determined average indicates that at least some of the first control pulses are not being detected.

2. The method of claim 1, further comprising the step of the signaling that an obstruction is present between the transmitter and the receiver in response to a determination that the receiver has not detected at least one full power light pulse during a burst interval.

3. The method of claim 1, wherein the detection sensitivity is adjusted so that the determined average is a value between N and N+1.

4. The method of claim 3 wherein the detection sensitivity is adjusted so that the determined average is about N+0.5.

5. The method of claim 1, wherein the step of automatically adjusting the detection sensitivity of the receiver by determining an average number of detected pulses per burst for a plurality of bursts further comprises:
  setting a number of bursts to use to determine the average number of detected pulses per burst to a first value if a prior determined average is within a predefined range and to a second value if the prior determined average is outside of the predefined range; the predefined range including a target value for the determined average and the first value being greater than the second value.

6. The method of claim 1, where the first and second power levels are greater than and less than, respectively, an average power level of a reflection of a full power pulse from the transmitter off of a reflective surface in the vicinity of the optical transmitter and optical receiver.

7. The method of claim 1, wherein the first power level is about −6 dB less than full power, and the second power level is about −10 dB less than full power.

8. The method of claim 1, wherein each burst has four full power pulses, one first control pulse and one second control pulse.

9. The method of claim 1, wherein the light pulses are modulated.

10. The method of claim 1, wherein the time between the start of successive bursts is no more than about 20 ms.

11. An optical safety beam system, comprising:
  An optical transmitter comprising a light source and a pulse control circuit configured to cause the light source to periodically emit bursts of a predetermined number of light pulses, each burst comprising N full power light pulses, N greater than or equal to 1, a first control pulse at a first power level less than full power and a second control pulse at a second power level less than the first power level;
  an optical receiver comprising a photodetector, a light pulse detection circuit coupled to the photodetector and producing a pulse detection signal, the light pulse detection circuit having an adjustable pulse detection sensitivity, and a detector control circuit receiving the pulse detection signal and providing a sensitivity adjustment signal to the detector circuit, the detector control circuit configured to:
  (i) determine an average number of detected pulses per burst for a plurality of bursts;
  (ii) signal the detection circuit to decrease detection sensitivity if the determined average value indicates that second control pulses are being detected; and
  (iii) signal the detection circuit to increase the detection sensitivity if the determined average value indicates that at least some of the first control pulses are not being detected.

12. The system of claim 11, wherein the detector control circuit is further configured to determine if the receiver has not detected at least one full power light pulse during a burst interval and output an obstruction present signal in response to such a condition.

13. The system of claim 11, where the first and second power levels are greater than and less than, respectively, an average power level of a reflection of a full power pulse from the transmitter off of a reflective surface in the vicinity of the optical transmitter and optical receiver.

14. The system of claim 11, wherein the first power level is about −6 dB less than full power, and the second power level is about −10 dB less than full power.

15. The system of claim 11, wherein the bursts emitted from the optical transmitter have four full power pulses, one first control pulse and one second control pulse.

16. The system of claim 11, wherein the pulse control circuit comprises a microcontroller and a variable current drive circuit that receives power and timing control signals from the microcontroller, and the light source is an IR emitter that receives current from the variable current drive circuit.

17. The system of claim 11, wherein the light pulse detection circuit comprises:
  a photodetector;
  a DC blocking and filter circuit receiving a signal from the photodetector; and
  a variable sensitivity demodulating pulse detector circuit receiving an output signal from the DC blocking and filter circuit, a sensitivity control signal from the detector control circuit, and producing the pulse detection signal.

18. The system of claim 17, wherein the variable sensitivity demodulating pulse detector circuit comprises a variable attenuator that reduces the magnitude of the signal from the DC blocking and filter circuit and a demodulator that processes the attenuated signal.

19. The system of claim 17, wherein the detector control circuit is a microcontroller.

20. The system of claim 11, wherein the photodetector, light pulse detection circuit and detector control circuit are mounted on a circuit board contained within an elongated housing having first and second ends; the photodetector positioned on an edge of the circuit board near the first end of the housing; the system further comprising:
  a transparent cover assembly positioned at the first end of the housing, the transparent cover assembly having a front and back portion, the front portion having a lens therein which focuses received light onto the photodetector;
  a visible LED mounted to the circuit board, the back portion of the cover assembly extending within the housing towards the LED and positioned to permit light from the visible LED to enter the cover assembly when the LED is illuminated;
  wherein, light from the LED entering the back portion of the cover assembly will be conveyed to and emitted at the front portion of the cover assembly such that the LED light is visible at the first end of the housing.

21. The system of claim 20, wherein, the cover assembly is generally cylindrical and the light from the LED is conveyed to a circumferential region at the front of the cover assembly surrounding at least part of the lens.

* * * * *